May 15, 1951 S. G. ISSERSTEDT 2,553,517
ELECTRICAL REMOTE CONTROL

Filed Feb. 15, 1946 2 Sheets-Sheet 1

INVENTOR
S. G. ISSERSTEDT
By: Fetherstonhaugh & Co.
ATT'YS

May 15, 1951     S. G. ISSERSTEDT     2,553,517
ELECTRICAL REMOTE CONTROL
Filed Feb. 15, 1946     2 Sheets-Sheet 2
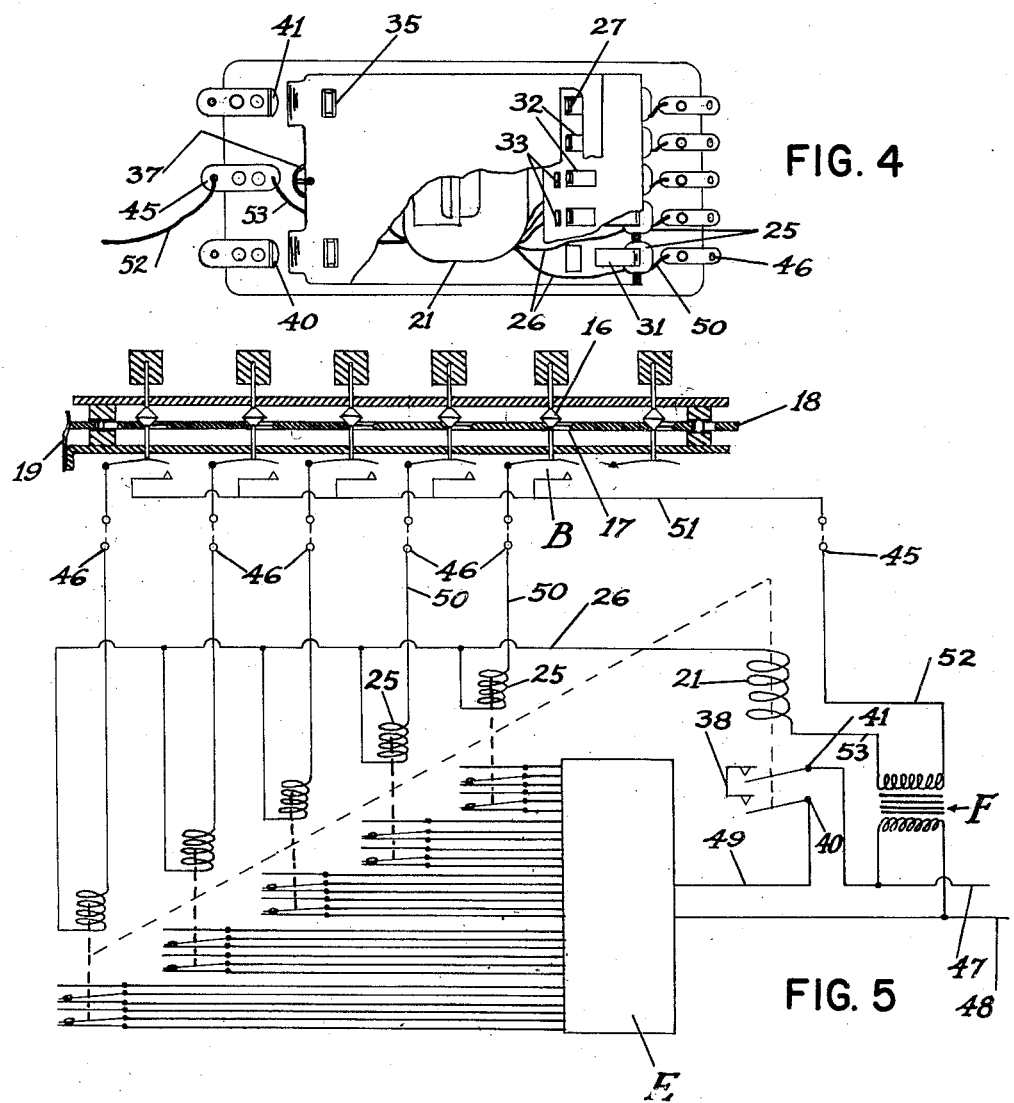
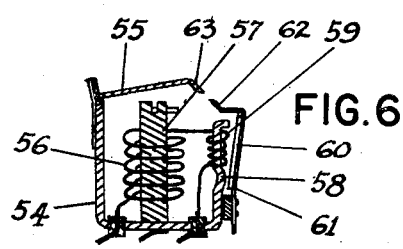
INVENTOR
S. G. ISSERSTEDT
By: Featherstonhaugh & Co
ATT'YS Patented May 15, 1951

2,553,517

UNITED STATES PATENT OFFICE 2,553,517

ELECTRICAL REMOTE CONTROL

Siegfreid Gordon Isserstedt, Toronto, Ontario, Canada

Application February 15, 1946, Serial No. 647,931

8 Claims. (Cl. 175—320)

This invention relates to electrical remote controls, and in particular to a control for remotely and selectively performing multiple switching operations by means of relay actuation.

Remote circuit control units for performing selective multiple switching operations have previously been known. In most cases such units have employed separate relays, stepping relays, remotely controlled motors, operating rotary switches, or separate relays for each switching operation required. Thus, they have involved relatively expensive equipment which, by reason of the plurality of separate elements used for performing the functions required, has rendered these devices relatively complex and in some cases relatively bulky. Moreover, the use of stepping relays, rotary switches or remotely controlled motors, etc. presents a further disadvantage as they introduce a time lag in the operation of the unit which is not desirable. Furthermore, a separate relay usually is required to turn on and off the current supplied to the system under control. These disadvantages are illustrative among a number that are apparent in these types of controls previously used.

Such disadvantages can be avoided according to the present invention while attaining further advantages not provided by the prior art.

It is an object of the present invention to provide a single relay operated control which will remotely and selectively operate a series of multiple contacts.

A further object of the invention is to provide a device of this kind which is also adapted simultaneously to turn on and off the current supplied to the circuits controlled.

A further object of the invention is to provide a device of this kind incorporating a multiple switching relay which will automatically switch off the current so that no current flows during switching operations.

A further object of the invention is to provide a multiple switching relay which selectively operates a number of multiple contacts which are individually shielded.

A still further object of the invention is to provide a multiple switching control of this general character which, by reason of its more unitary construction and minimum number of parts, will be relatively inexpensive to manufacture and which will lend itself readily to mass production.

With these and other objects in view, the invention generally comprises a remote control unit incorporating one relay for effecting all switching operations and operating in conjunction with electro-magnetic means for selecting the circuit or circuits required to be controlled. The control unit preferably incorporates a means for automatically engaging or disengaging a plurality of contacts independent of the selective magnetic means and preferably also a means of interrupting the current supplied to the selectively operated means until the desired contact has been effected.

The invention will be clearly understood by reference to the following detailed specification taken in conjunction with the accompanying drawings. In order to illustrate the invention clearly, the use of a remote control unit for the selective operation of a radio receiver will be generally referred to in the present operation. It will be understood, however, that the invention generally applies to other fields where such control is desirable or necessary.

In the drawings,

Fig. 4 is a top plan view of Fig. 2 with a portion of the armature of the relay broken away to illustrate other parts of the construction.

Fig. 5 is a diagrammatic wiring detail of a unit for selectively controlling a series of five multiple switches; and Fig. 6 is a transverse sectional detail of an alternative manner of constructing the relay and electro-magnetic selective means and wherein shielding between the control circuit and the controlled circuit or circuits is not necessary.

Figure 1:
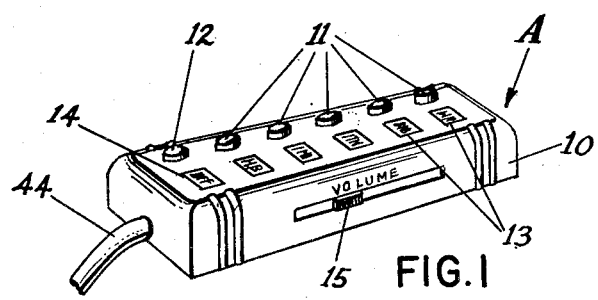
Fig. 1 is a perspective view of a remote control unit as it might be generally constructed for control of a radio receiver.

Referring to the drawings, A indicates a remote control unit which may include any suitable casing 10 carrying the mechanically interlocked control buttons or actuators 11 employed for individual circuit control and designed to establish a circuit by remote control when operated. These buttons or switches are mechanically linked also with the control button 12 which constitutes a means of switching off. Thus, through the mechanical interconnection of these buttons, the depression of one will release all others of the series. Such a means of actuation is known. In the present illustration, as applied to the control of a radio receiver, the various stations controlled by each button or actuator 11 may be displayed suitably such as at 13 which may constitute an illuminated panel. Similarly, the off switch is indicated as at 14. In known manner, a suitable volume control 15 may be incorporated.

In respect to the mechanical interconnection of the switches 11 and including the switch 12, reference might be made at this point to Fig. 5 which shows in each case an actuating element 16 having a bevelled surface designed to cooperate with the upper and lower bevelled surfaces 17 of corresponding openings formed in a horizontal slide 18, spring-pressed as at 19. From this it is obvious that if any one of the control buttons are depressed, the coaction between the lower bevelled surfaces of the actuating element 16 with the upper bevelled surface of the corresponding opening will cause the slide 18 to move to the left as shown in Fig. 5. This will retain a push button in the downwardly depressed position by reason of the lower bevelled surfaces 17 engaging the upper bevelled surface of the actuator 16 retaining the button from moving back to its initial position until depression of another of the control buttons.

The depression of any one of the control buttons 11 will cause the corresponding switch of the series B to close and to cause a flow of current through the circuit which it controls which, in each instance, includes electromagnetic means for initiating the required circuit selection and the single operating relay. In this connection, reference is made particularly to Figs. 2 and 3 so that the general form of construction may be readily understood.

The control box incorporates the main operating relay C. This constitutes a relay of generally known form including the core 20 and the coil 21, the core being operatively in contact with the frame 22 which, as here shown, is of substantially channel form having an upright rear wall 23, while the frame 22 may be extended vertically upright to form a series of separate upstanding fingers 24 designed to form the core of an electro-magnetic coil 25. The fingers 24 forming the coil may, of course, take the form of separate individual cores if desired.

The circuit for operating the relay C is, according to the present invention, initiated through one of the coils 25 which in each instance connect with the coil 21 and the relay C by means of a suitable connecting lead 26. The individual fingers 24, or in other words the core for each electro-magnetic coil 25, are designed to be energized by the coil 25 in each instance as the case may be and to attract a floating actuator 27 which forms a part of each electro-magnetic coil unit. Each floating actuator 27 is freely supported at its base by means of a spring plate 28, which may be disposed below the chassis mounting plate 29, the insulated relay base 30 and the frame 22 being suitably orificed to permit of such support.

Figure 2:
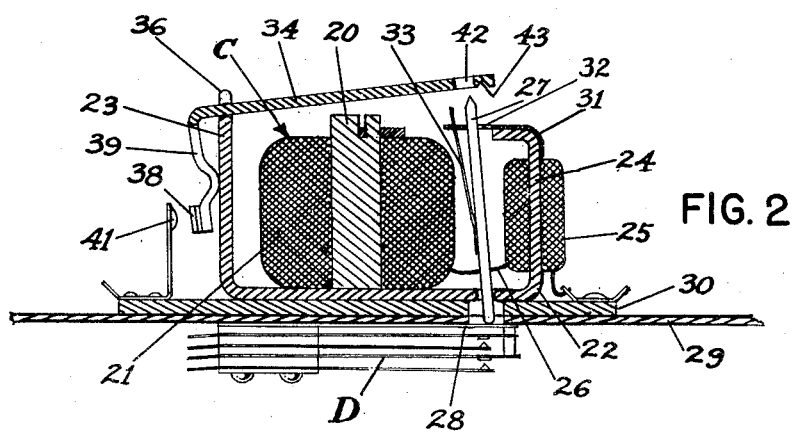
Fig. 2 is a transverse section taken through the mechanism carried within the control box and showing the control relay in open position.
Figure 3:
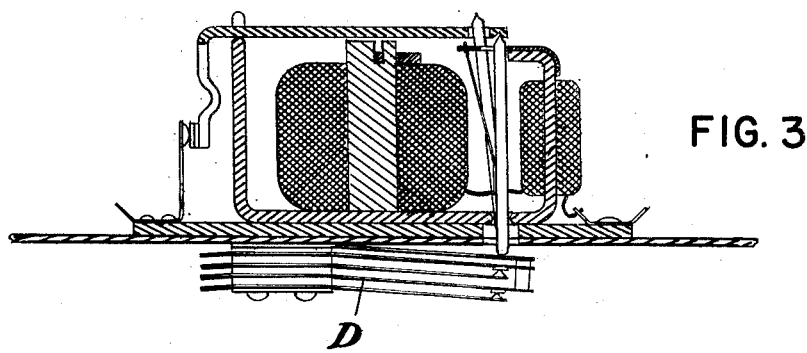
Fig. 3 is a view similar to Fig. 2 but showing the relay in the closed position for effecting a circuit connection.

The core 24 in each instance preferably includes a unitary plate 31 made of non-magnetic material and designed to be supported on the plurality of cores 24. It is designated to project inwardly and has a series of slots indicated by the numeral 32, one for each electro-magnetic unit and designed to freely receive the upper end of the floating actuator 27 in each instance and to limit its horizontal movement. Each floating actuator preferably also includes a spring such as the leaf spring 33 which is anchored at one end to the floating actuator and is freely supported towards its opposite end in one of a series of slots, formed in the fingers 31, spaced apart and horizontally aligned with the slots 32 to form a means of maintaining the floating actuator in the inoperative position, as illustrated in Fig. 2, and illustrated in top plan view in Fig. 4. It will be obvious, of course, that when any one of the coils 25 is energized, the core 24 thereof will attract the floating actuator 27 and cause it to start to swing towards the core, thus moving the floating actuator from its normal position of rest (Fig. 2) to a position slightly to the right of position of rest as shown in Fig. 3. Similarly, when the coil 25 is deenergized the spring 33 will cause it to return to its position of rest.

Swingably supported, preferably from the rear wall 23 of the frame 22, is an armature plate 34, generally performing the functions of an operating element, which may be mounted by means of suitable slots 35 (Fig. 4) through which suitable upright lugs 36 disposed on the rear wall 23 are designed to project. The armature plate 34 is held in inoperative position in any suitable way, such as by a suitable coil spring 37 (Fig. 4). The armature plate 34, preferably also carries a plurality of contacts such as a contact plate 38 supported from suitable depending arms 39 and designed to make contact with a plurality of stationary contacts such as the contacts 40 and 41 (Fig. 4) for initiating a circuit when the relay C is operated. The relay C, of course, as will be obvious, operates in a conventional manner so that upon energization of the core 20, the armature is attracted thereto and swings downwardly from the position shown in Fig. 2 to the position shown in Fig. 3.

According to the present invention, the armature takes the form of a unitary plate which is designed to overlie each of the floating actuators 27. Adjacent to the free edge of the armature plate 34, a longitudinally extending slot 42 is formed. This is disposed directly to overlie the position of rest of all of the floating actuators 27. In the lower face of the armature plate between its outer free edge and the slot 42, a longitudinally extending groove 43 is disposed. This groove is preferably V-shaped in cross-section, while the upper end of each floating actuator 27 is preferably of corresponding cross-section so that there may be a cooperating action between the groove 43 and the free end of each floating actuator when any one of the latter are moved from their normal positions of rest to active position. It will be apparent, therefore, that if any selected coil 25 is energized together with coil 21, with which each of the coils is connected in series, the energization of the coil 25 will through the core 24 attract the corresponding floating actuator 27. Simultaneously, the relay coil 21 will be energized to attract the armature plate 34 downwardly with slight time lag so that it will be moved to the position shown in Fig. 3. However, during this time lag between the energization of a particular coil 25 and coil 21, the floating actuator 27 will be caused to swing towards the right as viewed in Fig. 2 so that when the armature plate 34 moves downwardly, the upper end of the displaced floating actuator 27 (in active position) will be engaged by the groove 43 of the armature and will be held in the displaced position and at the same time downwardly actuated. On the other hand, all the other floating actuators 27 of the series which remain in their normal position of rest will register with the slot 42 and consequently will not be actuated since their upper ends will pass through the slot 42 and be positioned above the plane of the upper surface of the armature as shown in Fig. 3.

The downward projection of the selected floating actuator will have the effect of depressing the spring plate 28 which supports it in normal position. This plate is designed to function as an actuator to operate any number of contacts according to the purpose required and, for instance, the single-throw double-pole switch D, such as shown in Figs. 2 and 3. The several push buttons 11 of the control unit A are connected by a cable 44 comprising the necessary number of wires to the relay unit, the common wire of the switches operated by the push button 11 being connected to the terminal 45 while the individual control wire of each switch is connected to the appropriate terminal 46 (Fig. 4). Thus, when contact has been established through the depression of the appropriate push button, it will be obvious that current will flow through the relay coil 21 and through the selected coil 25 of the series to cause selection of the appropriate floating actuator 27 and its actuation by the armature plate 34 as described.

Reference is made to the wiring diagram illustrated in Fig. 5 which illustrates the various connections necessary for controlling five stations of, for instance, a radio receiver, the number of stations controlled being purely arbitrary. Referring to the diagram, the terminals 46 are connected by cable with one side of each of the switches B, while the terminal 45 is likewise connected by cable with the other side of each of these switches. Current is supplied to the system by the leads 47 and 48 connecting with the source of power. Lead 48 is connected to the radio receiver E and to one side of a stepped down transformer F which supplies current for the operation of the relays. Lead 47 is connected to the other side of the low voltage transformer and to the contacts 40 and 41. Contact 40 is connected by the lead 49 to the radio receiver. Contacts 40 and 41 are connected via the shorting bar 38 upon energization of the relay coil 21. Consequently, current is supplied via the leads 47 and 48 to the radio receiver E.

As previously indicated, relay coil 21 is connected by the leads 26 to each one of the coils 25 and the other side of the coils 25 is connected through the lead 50 to the terminals 46 and through the cable to one side of the switches B. The common wire of these switches is connected by the lead 51 through the cable with the contact 45. The secondary of transformer F is connected by lead 52 with the terminal 45 and by lead 53 to the coil 21 of the relay C. It is, therefore, obvious that when any one of the buttons 11 is depressed, low voltage current is supplied from the secondary of the transformer F through the lead 52 to the terminal 45. Current will flow through the cable and via the lead 51 to and through the switch B which is closed and through the cable to the corresponding terminal 46, then through the lead 50 to the corresponding coil 25 and via the lead 26 through the coil 21 of the relay and through the lead 53 to the opposite end of the secondary of transformer F. Establishment of this circuit will effect the operation described, viz. the energization of the coil 21 and the appropriate coil 25, the swinging of the appropriate floating actuator 27 as attracted through the core of the coil 25, the engagement of the upper end of this actuator by the grooves 43 of the armature plate as it swings down, after a slight time lag, attracted by the relay C and the downward movement of the thus selected floating actuator 27, which results in the depression of its spring plate 28 and the closing of the contacts of the switch D with which it is associated. The length of the floating actuators is preferably so chosen that the contacts of switch D will be effected just prior to the engagement of the contact bar 38 with the contacts 40 and 41. Therefore, contact is made in the switch D while the current is interrupted between the contact 38 and contacts 40 and 41. Consequently any noises that might be caused by the making of the contacts in the switch D are eliminated because of the current interruption during the making of the contacts. Likewise in other circuits, such as telephone circuits, where current is carried in the contacts D, this will avoid the burning of these contacts by sparking.

Upon the closing of the contact bar 38 with the contacts 40 and 41, current is caused to flow to the radio receiver E which will be caused to operate in accordance with the station which has been selected by the appropriate floating actuator 27. Similar action takes place, of course, in the case of any of the stations selected and when it is desired to remotely shut off the radio, it is only necessary to actuate the push button 12 which, as previously described, will function similarly to the other push buttons to actuate the mechanical connection employed such as the bar 18, thus releasing the push button of the last station in operation and opening the circuit.

One feature which makes the relay above described especially applicable to cases where it is desirable to shield the control circuit from the controlled circuit lies in the floating actuator 27. This as is obvious lends very readily to shielding. Where, however, such shielding is not necessary, an alternative form of actuation may be resorted to. In this case the armature plate 55 is resiliently connected to the rear plate of the frame and is pulled downwardly in a similar manner by the coil 56 surrounding the relay core 57. The fingers 58 or otherwise the cores of the coils 59, corresponding with the coils 25, connected in series with the relay coil 56, are designed to attract the armature 60 attached to but insulated from the spring arm 61. The spring arm 61 is formed with an inwardly and upwardly projecting finger 62 which is disposed to cooperate with the lip 63 of the armature plate 55. Accordingly, therefore, when current flows through the coils 56 and one of the coils 59, according to selection, the armature 60 will be attracted through the core of coil 59, thus positioning the finger 62 below the lip 63. Accordingly, therefore, in the slight time lag as previously described, the lip 63 will be moved downwardly to engage the finger 62 and to establish contact between the selected finger 62 and lip 63, thus establishing the selected circuit. It will be obvious that the selected circuit may be operated in exactly the same way by this type of construction as in the case of the construction described in connection with Figs 1 to 5.

While in the foregoing the invention has been particularly identified with the remote control of electrical circuit, it will, of course, be understood that the invention by no means is restricted to this particular field. It will be clearly appreciated that the floating actuators, when caused to move as described, may be adapted to perform mechanical operations and therefore the invention clearly applies to the remote control of mechanically operated devices where such a control is desirable.

Thus, through a particularly simple structure employing one main electro-magnetic operating element and one or more electro-magnetic units connected in series with the main electro-magnetic operating element, one of a series of agencies required to be operated may be controlled according to the desired selection.

What I claim as my invention is:

1. A remote control for a plurality of electrical circuits comprising a plurality of switches for selecting the circuit required to be operated, a main electro-magnetic actuator, a plurality of electro-magnetic units connected in circuit with said actuator, each one of said electro-magnetic units being designed for electrical connection with one of said switches respectively, means in connection with each of said switches for supplying current to its electro-magnetic unit and for operating said actuator upon operation of said switch, a movable circuit selector cooperatively related to each of said electro-magnetic units and operable thereby to an active position on energization of its electro-magnetic unit, switch means operable by said circuit selector for closing the circuit controlled thereby, means in connection with said actuator designed to operate any of said selectors when in the active position for closing the selected circuit.

2. A remote control for a plurality of electrical circuits as claimed in claim 1 in which switch means is provided, operable upon movement of said actuator for supplying current from a main circuit to the selected circuit.

3. A remote control for a plurality of electrical circuits as claimed in claim 2 in which switch means is provided, operable upon movement of said actuator for supplying current from a main circuit to the selected circuit, said switch means being operated successively to the closing of the selected circuit by its selector.

4. An electrical remote control comprising a plurality of switches for selecting a desired circuit to be operated, a main electro-magnetic operating element, a plurality of electro-magnetic units connected in circuit with said operating element, each one of said electro-magnetic units being designed for electrical connection with one of said switches respectively, each of said switches when operated being designed to complete its circuit to supply current to its electro-magnetic unit and to cause operation of said operating element, a floating actuator in connection with each electro-magnetic unit and operable thereby to an active position, said operating element engaging and moving any of the floating actuators axially when disposed in the active position to mechanically select and complete a desired circuit.

5. An electrical remote control comprising a plurality of switches for selecting a desired circuit to be operated, at least one electro-magnetic operating element and at least two electro-magnetic units connected in circuit with said operating element, each one of said electro-magnetic units being designed with electrical connection with one of said switches, each of said switches when operated being designed to complete its circuit to supply current to its electro-magnetic unit, a floating actuator in connection with each electro-magnetic unit, the latter being designed to displace said floating actuator in one direction to an active position and an actuating element operated by said electro-magnetic operating element substantially simultaneously with the operation of said electro-magnetic unit to engage and displace the floating actuator in another direction to select and complete a predetermined circuit.

6. An electrical remote control as claimed in claim 5 in which the main electro-magnetic operating element is formed with a movable armature plate extending linearly in effect to overlie all floating actuators of said electro-magnetic units and means in connection with said armature plate for by-passing all floating actuators not moved to an active position whereby selectively to operate any floating actuator disposed in an active position.

7. An electrical remote control as claimed in claim 1 in which the main electro-magnetic operated element includes a movable armature plate having linear extent in effect to overlie all movable actuators, said plate being slotted in an area overlying the normal position of rest of each floating actuator and designed to by-pass said actuators by means of said slots when said armature plate is operated, said plate being solid beyond said slots in a position coinciding with the active positions of each movable actuator.

8. An electrical remote control comprising a plurality of switches for selecting a desired control operation, a main electro-magnetic operating element, a plurality of electro-magnetic selector units all connected in circuit with said operating element, and each connected to one only of said switches, each one of said electro-magnetic selector units being wired for electrical connection in series with said electro-magnetic operating element and with its related switch, each of said switches when operated being designed to complete its circuit to supply current to its electro-magnetic selector unit and to cause operation of said operating element, a plurality of movable control-actuators, each of said control-actuators being co-operatively related with one of said electro-magnet selector units, urging means for normally urging each of said control-actuators to an inactive position with relation to said operating element, each of said electro-magnetic selector units being designed when supplied with current to overcome said latter mentioned urging means and to move its related control-actuator into an active position with relation to said operating element, said operating element being designed to operate each of said control-actuators when moved by its related electro-magnetic selector unit to an active position.

SIEGFREID GORDON ISSERSTEDT.

REFERENCES CITED

The following references are of record in the file of this patent:

UNITED STATES PATENTS

| Number | Name | Date |
| --- | --- | --- |
| 2,276,607 | Brune | Mar. 17, 1942 |
| 2,315,191 | Elliott | Mar. 30, 1943 |